(12) United States Patent
Park et al.

(10) Patent No.: US 7,613,085 B2
(45) Date of Patent: Nov. 3, 2009

(54) METHOD AND APPARATUS FOR MANAGING DEFECTIVE AREA ON RECORDING MEDIUM, AND RECORDING MEDIUM USING THE SAME

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 104 days.

(21) Appl. No.: 12/078,336

(22) Filed: Mar. 28, 2008

(65) Prior Publication Data

US 2008/0189571 A1 Aug. 7, 2008

Related U.S. Application Data

(62) Division of application No. 10/700,664, filed on Nov. 5, 2003, now Pat. No. 7,372,788.

(30) Foreign Application Priority Data

Jan. 14, 2003 (KR) .............................. 10-2003-2328

(51) Int. Cl.
*G11B 15/52* (2006.01)
(52) U.S. Cl. ............... 369/47.14; 369/53.17; 369/275.3
(58) Field of Classification Search ..................... None
See application file for complete search history.

(56) References Cited

U.S. PATENT DOCUMENTS

| | | | |
|---|---|---|---|
| 4,558,446 A | 12/1985 | Banba et al. |
| 4,733,386 A | 3/1988 | Shimoi et al. |
| 4,807,205 A | 2/1989 | Picard et al. |
| 4,963,866 A | 10/1990 | Duncan |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,289,450 A | 2/1994 | Mizumoto et al. |
| 5,319,626 A | 6/1994 | Ozaki et al. |
| 5,343,456 A | 8/1994 | Maeda et al. |

(Continued)

FOREIGN PATENT DOCUMENTS

CN 1134017 A 10/1996

(Continued)

OTHER PUBLICATIONS

JIS handbook data processing for hardware, Japan, Japanese Standards Association Inc., Apr. 21, 1999, pp. 1064-1070.

*Primary Examiner*—Paul Huber
(74) *Attorney, Agent, or Firm*—Birch, Stewart, Kolasch & Birch, LLP

(57) ABSTRACT

A method and apparatus for managing a defective area of a recording medium, are discussed. According to an embodiment, the method includes identifying a finalization state by searching identification information indicating whether or not the recording medium is finalized; searching a location of defect list information recorded in a management area when identification information indicating the recording medium is finalized; and searching a location of latest temporary defect list information recorded in a temporary management area when identification information indicating the recording medium is not finalized.

16 Claims, 7 Drawing Sheets

U.S. PATENT DOCUMENTS

| | | |
|---|---|---|
| 5,404,357 A | 4/1995 | Ito et al. |
| 5,442,611 A | 8/1995 | Hosaka et al. |
| 5,448,728 A | 9/1995 | Takano et al. |
| 5,475,820 A | 12/1995 | Natrasevschi et al. |
| 5,481,519 A | 1/1996 | Hosoya et al. |
| 5,495,466 A | 2/1996 | Dohmeier et al. |
| 5,528,571 A | 6/1996 | Funahashi et al. |
| 5,553,045 A | 9/1996 | Obata et al. |
| 5,577,194 A | 11/1996 | Wells et al. |
| 5,608,715 A | 3/1997 | Yokogawa et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,848,038 A | 12/1998 | Igarashi et al. |
| 5,867,455 A | 2/1999 | Miyamoto et al. |
| 5,878,020 A | 3/1999 | Takahashi |
| 5,914,928 A | 6/1999 | Takahashi et al. |
| 5,940,702 A | 8/1999 | Sakao et al. |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma et al. |
| 6,341,278 B1 | 1/2002 | Yamamoto et al. |
| 6,373,800 B1 | 4/2002 | Takahashi et al. |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 | 11/2002 | Park et al. |
| 6,480,446 B1 | 11/2002 | Ko et al. |
| 6,493,301 B1 | 12/2002 | Park et al. |
| 6,496,807 B1 | 12/2002 | Inokuchi et al. |
| 6,529,458 B1 | 3/2003 | Shin et al. |
| 6,542,450 B1 | 4/2003 | Park et al. |
| 6,564,345 B1 | 5/2003 | Kim et al. |
| 6,581,167 B1 | 6/2003 | Gotoh et al. |
| 6,606,285 B1 | 8/2003 | Ijtsma et al. |
| 6,615,363 B1 | 9/2003 | Fukasawa et al. |
| 6,631,106 B1 | 10/2003 | Numata et al. |
| 6,633,724 B1 | 10/2003 | Hasegawa et al. |
| 6,667,939 B1 | 12/2003 | Miyamoto et al. |
| 6,671,249 B2 | 12/2003 | Horie et al. |
| 6,697,306 B2 | 2/2004 | Sako et al. |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki et al. |
| 6,934,236 B2 | 8/2005 | Lee et al. |
| 6,999,398 B2 | 2/2006 | Yamamoto et al. |
| 7,002,882 B2 | 2/2006 | Takahashi et al. |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,317,670 B2 | 1/2008 | Park |
| 7,327,654 B2 | 2/2008 | Hwang et al. |
| 7,349,301 B2 | 3/2008 | Terada et al. |
| 7,372,788 B2 | 5/2008 | Park et al. |
| 7,379,402 B2 | 5/2008 | Ko et al. |
| 7,483,355 B2 | 1/2009 | Park |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |

| | | | |
|---|---|---|---|
| 2005/0055500 A1 | 3/2005 | Park | |
| 2005/0060489 A1 | 3/2005 | Park | |
| 2005/0068877 A1 | 3/2005 | Yeo | |
| 2005/0083740 A1 | 4/2005 | Kobayashi | |
| 2005/0083767 A1 | 4/2005 | Terada et al. | |
| 2005/0083830 A1 | 4/2005 | Martens et al. | |
| 2005/0195716 A1 | 9/2005 | Ko et al. | |
| 2005/0207262 A1 | 9/2005 | Terada et al. | |
| 2005/0289389 A1 | 12/2005 | Yamagami et al. | |
| 2006/0077827 A1 | 4/2006 | Takahashi | |
| 2006/0195719 A1 | 8/2006 | Ueda et al. | |
| 2006/0203635 A1 | 9/2006 | Ko et al. | |
| 2006/0203638 A1 | 9/2006 | Ko et al. | |
| 2006/0203684 A1 | 9/2006 | Ko et al. | |
| 2006/0227694 A1 | 10/2006 | Woerlee et al. | |
| 2007/0294571 A1 | 12/2007 | Park et al. | |
| 2008/0046780 A1 | 2/2008 | Shibuya et al. | |

FOREIGN PATENT DOCUMENTS

| | | |
|---|---|---|
| CN | 1140897 C | 1/1997 |
| CN | 1227950 A | 9/1999 |
| CN | 1273419 A | 11/2000 |
| CN | 1675708 A | 9/2005 |
| CN | 1685426 A | 10/2005 |
| DE | 199 54 054 A1 | 6/2000 |
| EP | 0314186 A2 | 5/1989 |
| EP | 0325823 A1 | 8/1989 |
| EP | 0350920 A2 | 1/1990 |
| EP | 0464811 A2 | 1/1992 |
| EP | 0472484 A2 | 2/1992 |
| EP | 0477503 A2 | 4/1992 |
| EP | 0556046 A1 | 8/1993 |
| EP | 0871172 A2 | 10/1998 |
| EP | 0908882 A2 | 4/1999 |
| EP | 0974967 A1 | 1/2000 |
| EP | 0989554 A1 | 3/2000 |
| EP | 0997904 A1 | 5/2000 |
| EP | 1026681 B1 | 8/2000 |
| EP | 1043723 A1 | 10/2000 |
| EP | 1132914 A2 | 9/2001 |
| EP | 1148493 A2 | 10/2001 |
| EP | 1152414 A2 | 11/2001 |
| EP | 1239478 A1 | 9/2002 |
| EP | 1274081 A2 | 1/2003 |
| EP | 1298659 A1 | 4/2003 |
| EP | 1329888 A1 | 7/2003 |
| EP | 1347452 A2 | 9/2003 |
| EP | 1547065 A0 | 6/2005 |
| EP | 1564740 A1 | 8/2005 |
| EP | 1573723 A0 | 9/2005 |
| EP | 1612790 A1 | 1/2006 |
| EP | 1623422 A0 | 2/2006 |
| GB | 2356735 A | 5/2001 |
| JP | 63-091842 A | 4/1988 |
| JP | 01-263955 A | 10/1989 |
| JP | 02-023417 A | 1/1990 |
| JP | 05-274814 A | 10/1993 |
| JP | 06-349201 A | 12/1994 |
| JP | 08-096522 A | 4/1996 |
| JP | 09-145634 A | 6/1997 |
| JP | 09-231053 A | 9/1997 |
| JP | 10-050005 A | 2/1998 |
| JP | 10-050032 A | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 A1 | 7/1998 |
| JP | 11-66751 A | 3/1999 |
| JP | 11-110888 A | 4/1999 |
| JP | 11-203792 A | 7/1999 |
| JP | 2000-090588 A | 3/2000 |
| JP | 2000-149449 A | 5/2000 |
| JP | 2000-195178 A | 7/2000 |
| JP | 2000-215612 | 8/2000 |
| JP | 2000-285607 A | 10/2000 |
| JP | 2000-293948 A | 10/2000 |
| JP | 2000-322835 A | 11/2000 |
| JP | 2001-023317 A | 1/2001 |
| JP | 2001-069440 A | 3/2001 |
| JP | 2001-110168 A | 4/2001 |
| JP | 2001-266464 A | 9/2001 |
| JP | 2001-351334 A | 12/2001 |
| JP | 2001-357623 A | 12/2001 |
| JP | 2002-015507 A | 1/2002 |
| JP | 2002-015525 A | 1/2002 |
| JP | 2002-056619 A | 2/2002 |
| JP | 2002-215612 A | 8/2002 |
| JP | 2002-245723 A | 8/2002 |
| JP | 2002-288938 A | 10/2002 |
| JP | 2002-329321 A | 11/2002 |
| JP | 2002-352522 A | 12/2002 |
| JP | 2003-536194 A | 12/2003 |
| JP | 2004-280864 A | 10/2004 |
| JP | 2004-280865 A | 10/2004 |
| JP | 2005-004912 A | 6/2005 |
| JP | 2005-535993 A | 11/2005 |
| JP | 2005-538490 A | 12/2005 |
| JP | 2005-538491 A | 12/2005 |
| JP | 2006-500724 A | 1/2006 |
| JP | 2006-503396 A | 1/2006 |
| JP | 2006-503996 A | 1/2006 |
| JP | 2006-519445 A | 8/2006 |
| KR | 1020040094301 A | 11/2004 |
| RU | 2005 103 626 | 9/2005 |
| RU | 2005 127 337 | 2/2006 |
| TW | 371752 | 10/1999 |
| TW | 413805 | 12/2000 |
| WO | WO-84/00628 A1 | 2/1984 |
| WO | WO-96/30902 A1 | 10/1996 |
| WO | WO-97/22182 A1 | 6/1997 |
| WO | WO-00/54274 A1 | 9/2000 |
| WO | WO-01/22416 A1 | 3/2001 |
| WO | WO-01/93035 A2 | 12/2001 |
| WO | WO-03/007296 A1 | 1/2003 |
| WO | WO-03/025924 A1 | 3/2003 |
| WO | WO-03/079353 A1 | 9/2003 |
| WO | WO-2004/015707 A1 | 2/2004 |
| WO | WO-2004/015708 A1 | 2/2004 |
| WO | WO-2004/015780 A1 | 2/2004 |
| WO | WO-2004/025648 A1 | 3/2004 |
| WO | WO-2004/025649 A1 | 3/2004 |
| WO | WO-2004/029668 A2 | 4/2004 |
| WO | WO-2004/029941 A1 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/068476 A1 | 8/2004 |
| WO | 2004/079632 A2 | 9/2004 |
| WO | WO-2004/015180 A1 | 9/2004 |
| WO | WO-2004/079731 A1 | 9/2004 |
| WO | WO-2004/079740 A1 | 9/2004 |
| WO | WO-2004/081926 A1 | 9/2004 |
| WO | WO-2004/093035 A1 | 10/2004 |
| WO | WO-2004/100155 A1 | 11/2004 |
| WO | WO-2004/100156 A1 | 11/2004 |
| WO | WO-2005/004123 A1 | 1/2005 |
| WO | WO-2005/004154 A2 | 1/2005 |

METHOD AND APPARATUS FOR MANAGING DEFECTIVE AREA ON RECORDING MEDIUM, AND RECORDING MEDIUM USING THE SAME

This application is a divisional of application Ser. No. 10/700,664, filed on Nov. 5, 2003 (now U.S. Pat. No 7,372,788), and for which priority is claimed under 35 U.S.C. § 120; and this application claims priority of Application No. 10-2003-0002328 filed in Korea on Jan. 14, 2003 under 35 U.S.C. § 119; the entire contents of all are hereby incorporated by reference.

BACKGROUND OF THE INVENTION

1. Field of the Invention

The present invention relates to optical recording methods and media, and in particular, to a method for managing a defective area on a WORM-type optical recording medium, and an optical recording medium using the same. The method is particularly adapted for recording data on write-once optical discs such as those using the recently developed Blu-ray disc format known as BD-WO.

2. Discussion of the Related Art

Data recording devices and media using optical read/write means have generally been categorized according to their writing capability or flexibility. Among read-only optical recording media, there are those using CD-ROM and DVD-ROM formats, which have no write capability. Among known disc standards that allow multiple write operations to be freely performed, there are CD-RW, DVD-RAM, DVD-RW, and DVD+RW types, which are rewritable compact discs and digital versatile discs.

WORM-type discs, on the other hand, are adopted for use as data storage devices requiring large storage capacity. Such discs, however, have limited recording flexibility and are for use in write-once read-many applications. These include CD-R and DVD-R types, which are recordable compact discs and digital versatile discs.

Meanwhile, a new type of high-density DVD, known as a Blu-ray disc, which is a large-capacity optical disc for recording high-quality audio and video data using a blue-violet laser, has been developed. The Blu-ray disc adopts a rewritable disc format known as BD-RE.

In the above types of optical recording media, surface imperfections and defects are generated during their manufacture, handling, or use. Accordingly, a method for managing the defective areas is used during a data recording operation, so that data reproduction can be carried out normally.

Referring to FIG. 1, an optical disc recording/reproducing device 100 for use with an optical recording medium 102, such as a BD-RE formatted disc, receives a data/command input from a host (or controller) 200. The optical disc recording/reproducing device 100 is provided with an optical pickup 104 for writing/reading data to/from an inserted optical recording medium, a pickup servo 106 for controlling the optical pickup to achieve proper tracking and to maintain a controlled distance with respect to the surface of the optical recording medium, a data processor 108 for processing data to and from the optical pickup by restoring to a desired signal value a reproduction signal received from the optical pickup or by modulating a recording signal received from the host for transfer to the disc, an interface 110 for transferring data between the host and the recording/reproducing device, a microcomputer 112 for controlling the recording/reproducing device, and a memory 114 for storing a program and for temporarily storing various information including defect management information and data. Under the control of the host 200 and stored programming, the optical pickup 104 reads data stored (or written) on a disc, providing a data signal input to the data processor 108 for reproduction processing and output, and writes data onto specified areas of the disc using a write signal output from the data processor. During a write operation, the optical disc recording/reproducing device 100 receives a data stream (or an encoded analog signal) and outputs the write signal to the optical pickup 104 in accordance with a command input via the host 200 and the program stored in the memory 114 and executed by the microcomputer 112.

Referring to FIG. 2, a BD-RE type disc for use with the device of FIG. 1 is divided into assigned areas. The assigned areas essentially comprise a data area set between a lead-in area (LIA) and a lead-out area (LOA). The data area includes an inner spare area (ISA) adjacent the lead-in area and an outer spare area (OSA) adjacent the lead-out area.

As above the optical disc recording/reproducing device 100 processes input data from a host 200 and writes the data onto an optical disc in clusters corresponding to an error correction code block unit. If during a write operation the existence of a defective area is detected in the data area, the optical disc recording/reproducing device 100 carries out a series of replacement write operations to write a data cluster corresponding to the detected defective area in one of the two spare areas (shown in the example of FIG. 2 as the ISA). Therefore, by writing a data cluster of a defective area in a spare area instead of the defective area, the data can be read and reproduced from the spare area, thus preventing the occurrence of writing errors even when an optical disc exhibits defects in the data area and thereby assuring data security and data integrity.

The above method is carried out using an optical recording medium that allows free access to the data recording areas, since a rewritable disc is used. Therefore, in managing the data of the defective areas, the optical disc recording/reproducing device has unlimited use of the recording area. If a WORM-type disc is used, however, the write operation is performed only once and must be completed before normal data retrieval operations by the user can be carried out.

For example, another type of Blu-ray disc, using a format known as BD-WO, has been recently developed. The BD-WO type disc, which is a write-once type disc, cannot make use of known methods for managing a defective area on the disc, since the standardization of this type of disc format has only recently begun. An immediate solution is required.

SUMMARY OF THE INVENTION

Accordingly, the present invention is directed to a method for managing a defective area on a write-once optical recording medium, and an optical recording medium (i.e., an optical disc such a BD-WO) using the same, that substantially obviates one or more of the problems due to limitations and disadvantages of the related art.

An object of the present invention, which has been devised to solve the foregoing problem, lies in providing a method for managing a defective area on a write-once optical recording medium, by which data written in and read from a defective area of the disc is relocated (rewritten), and then managed, through the performance of a replacement write operation in which the data is written in an alternative data area (spare area) corresponding to the defective area.

It is another object of the present invention to provide a method for managing a defective area on a write-once optical recording medium, by which normal data reproduction can be achieved after a data recording operation is completed, irrespective of the existence of one or more defective areas detected during recording.

It is another object of the present invention to provide data security and data integrity in using a write-once optical recording medium, particularly for data recording operations using a host computer reading from a BD-WO disc and employing a linear replacement technique at the time of recording.

It is another object of the present invention to provide a method for managing a defective area on a write-once optical recording medium, by which BD-WO standardization is facilitated.

It is another object of the present invention to provide an optical recording medium suitable for adopting the above method.

It is another object of the present invention to provide a system for utilizing an optical recording medium adopting the above method.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method for managing a defective area of a write-once optical recording medium, including steps of: detecting, after writing data in a predetermined recording sector of the optical recording medium, the existence of a defect within the predetermined recording sector; replacing the data written in the defective recording sector, by writing the data in a spare area assigned to a data area of the optical recording medium and writing locator information as temporary defect list information in an assigned recording sector of the optical recording medium, the locator information being indicative of the defective recording sector; and writing, as disc definition structure information in a defect management area assigned to a lead-in area of the optical recording medium, write location information for accessing the temporary defect list information and identification information for determining access to the write location information.

In another aspect of the present invention, there is provided a method for managing a defective area of a write-once optical recording medium, including steps of: identifying a disc finalization state by searching a defect management area assigned to a lead-in area of the optical recording medium and detecting and checking identification information indicative of the disc finalization state from disc definition structure information in the defect management area; selectively searching a write location of defect list information or temporary defect list information in the disc definition structure information, based on the identification information; and carrying out a replacement writing operation or a normal reproducing operation for the defective area, based on the selectively searched defect list information and temporary defect list information.

In another aspect of the present invention, there is provided a system having a programmable device for optically recording/reproducing data to/from a write-once optical recording medium. The device can be programmed to perform the necessary steps of the method of the present invention, including those for recording data and reproducing recorded data.

In another aspect of the present invention, there is provided a write-once optical recording medium including: a data area; a lead-in area disposed adjacent the data area; and a defect management area in the lead-in area for writing information pertaining to a plurality of write locations for accessing temporary defect list information and defect list information, and identification information for selective access to the write locations, as disc definition structure information, wherein the temporary defect list information and the defect list information are written in separate locations.

Adoption of the method of the present invention for an optical recording medium such as a BD-WO disc assures data security and data integrity, particularly during data recording operations using a host computer employing a linear replacement technique.

According to an embodiment, there is provided a method for managing a defective area of a recording medium, comprising: identifying a finalization state by searching identification information indicating whether or not the recording medium is finalized; searching a location of defect list information recorded in a management area when the identification information indicating the recording medium is finalized; and searching a location of latest temporary defect list information recorded in a temporary management area when the identification information indicating the recording medium is not finalized.

According to an embodiment there is provided an apparatus for managing a defective area of a recording medium, comprising: an optical pickup configured to read/write data from/on the recording medium; and a controller, operatively coupled to the optical pickup, configured to identify a finalization state by searching identification information indicating whether or not the recording medium is finalized, to search a location of defect list information recorded in a management area when the identification information indicating the recording medium is finalized, and to search a location of latest temporary defect list information recorded in a temporary management area when the identification information indicating the recording medium is not finalized.

According to an embodiment, there is provided a recording medium having a lead-in area and a data area, the recording medium comprising: an area used to indicate a finalization state by using identification information indicating whether or not the recording medium is finalized; a final management area used to store defect list information when the identification information indicating the recording medium is finalized; and a temporary management area used to store temporary defect list information when the identification information indicating the recording medium is not finalized.

It is to be understood that both the foregoing explanation and the following detailed description of the present invention are exemplary and illustrative and are intended to provide further explanation of the present invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Throughout the drawings, like elements are indicated using the same or similar reference designations.

Figure 3:
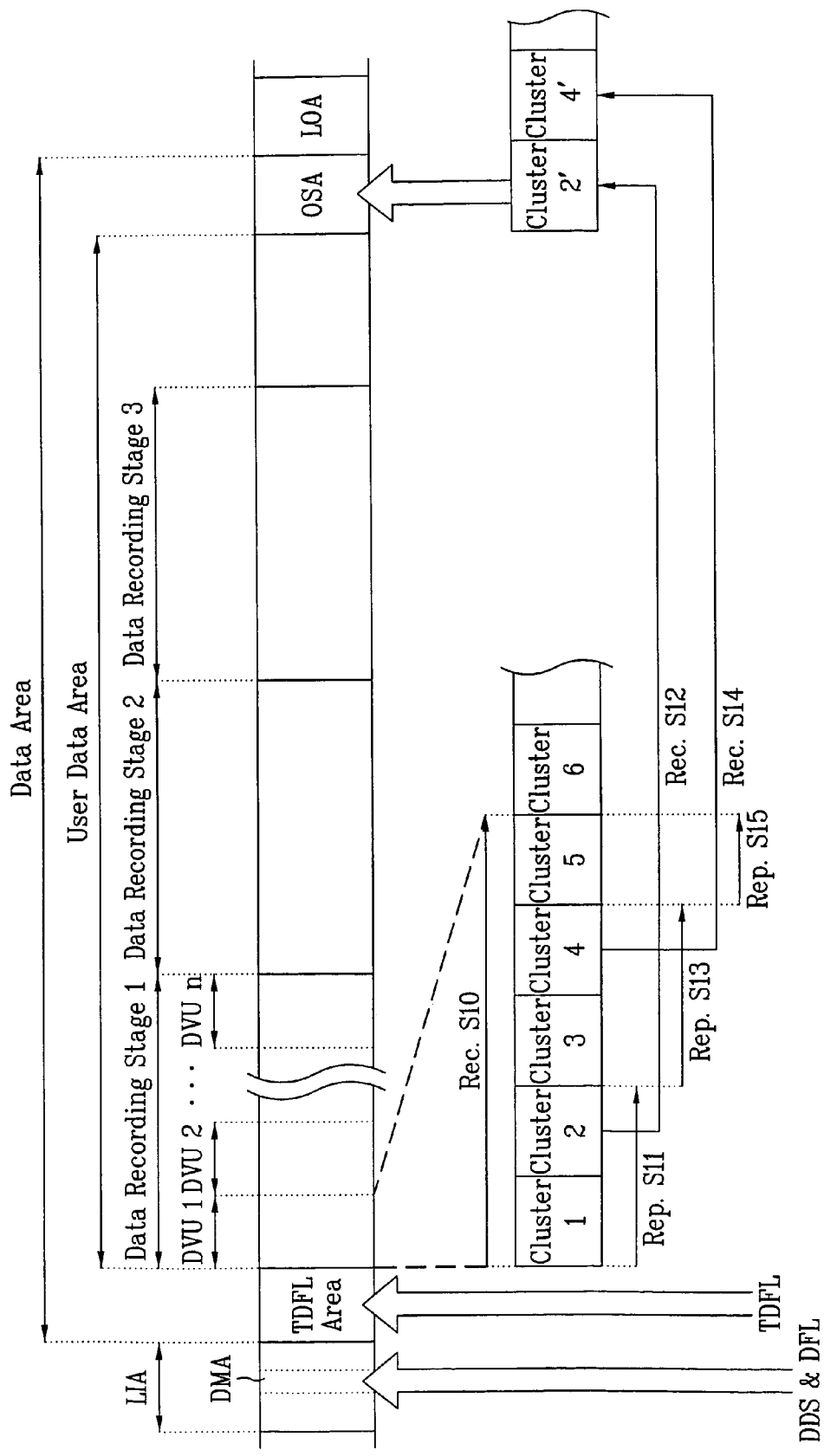
FIG. 3 is a diagram showing assigned areas of a write-once optical recording medium, such as a BD-WO type disc, for illustrating a method for managing a defective area on the disc, in accordance with a preferred embodiment of the present invention.

Referring to FIG. 3, in which assigned areas of an optical recording medium such as a BD-WO type disc are depicted to illustrate the method according to the present invention, a data area is set between a lead-in area (LIA) and a lead-out area (LOA), wherein the data area is essentially comprised of a user data area and a non-user data area disposed on either side of the user data area. The user data area is assigned both physical sector numbers (PSN) and logical sector numbers (LSN), while the non-user data areas are assigned physical sector numbers only. The non-user data areas are respectively comprised of an outer spare area (OSA) and a temporary defect list (TDFL) area. The outer spare area is for writing data corresponding to a defective area, i.e., replacement data, while the TDFL area is for writing defective area data locators pertaining to the defective areas as detected and the corresponding replacement data. The defective area data locator information may be written either cumulatively or continuously.

Though not shown in the drawings, the OSA and TDFL areas may be alternatively located or there may be additionally assigned areas, such as an inner spare area (ISA). For example, an ISA may be provided additionally or substituted for the OSA, or the TDFL area may be disposed in a non-user data area adjacent the OSA or in the LIA.

Figure 1:
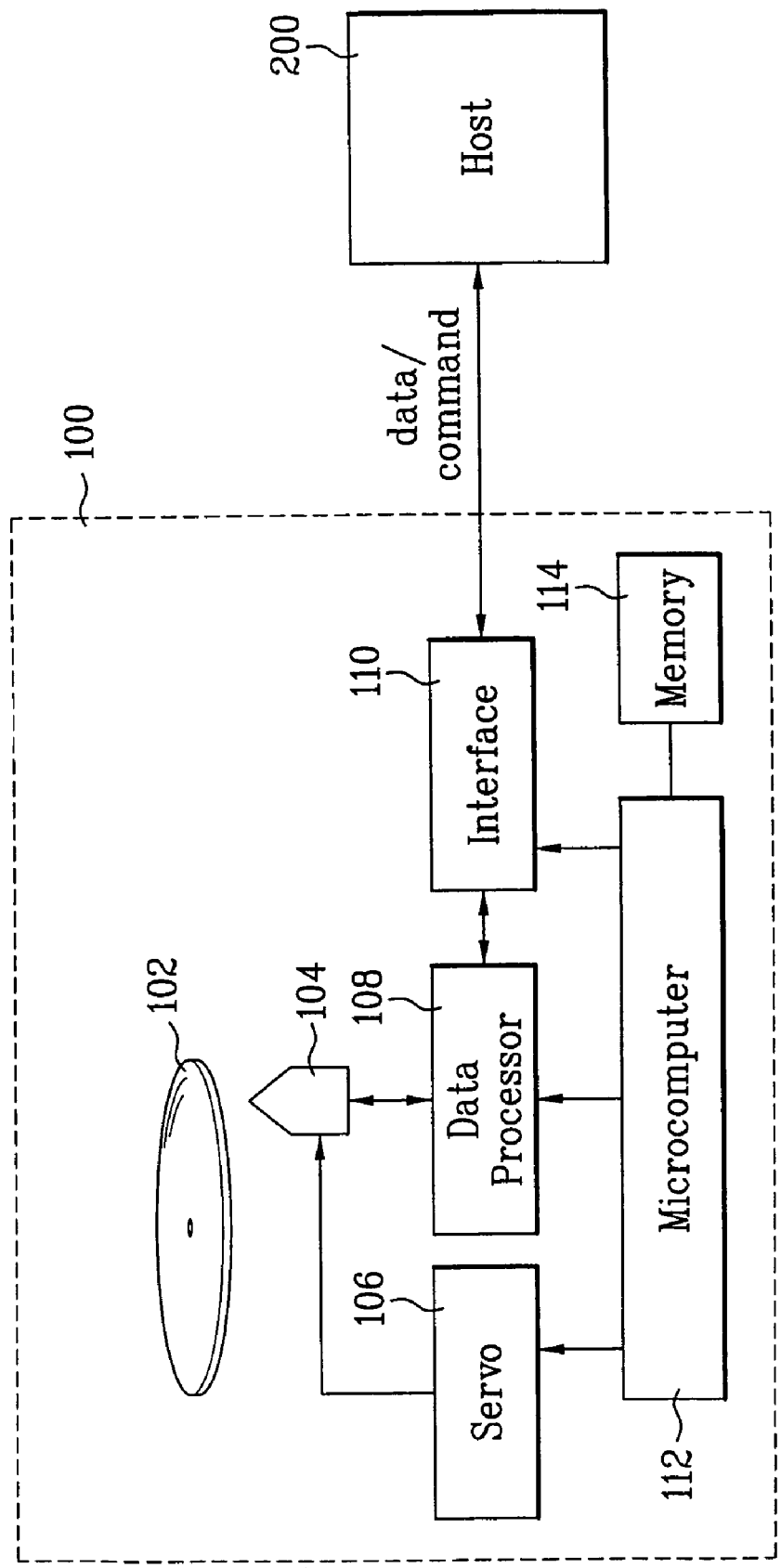
FIG. 1 is a schematic diagram of a general optical disc recording/reproducing device, according to a related art.
Figure 2:
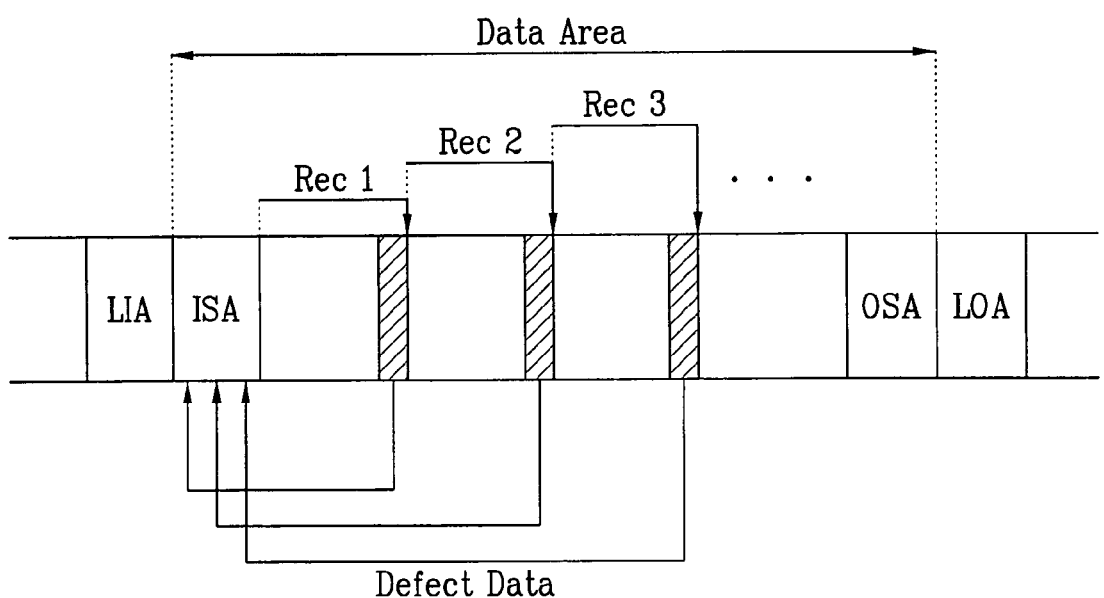
FIG. 2 is a diagram for illustrating a method for managing a defective area on a rewritable optical recording medium, such as a BD-RE type disc.

In recording data on an optical recording medium such as that shown in FIG. 3, the optical disc recording/reproducing device 100 of FIG. 1 executes an internal program to write data in a temporally continuous manner on a predetermined writing sector in the user data area. The write operation progresses until data recording ends or until the last recording sector has been recorded. Each instance of writing will be referred to as a data recording stage.

The predetermined writing sector is set as a defect verification unit (DVU) by which, during the data recording stage, a defective area is detected using a verify-after-write operation performed after each DVU. One DVU may have a recording size equivalent to any number of physical tracks or clusters, and for the sake of convenience in describing the embodiments of the present invention, this recording size has been arbitrarily set to five clusters. A plurality of defect verification units (DVU 1 through DVU n) make up one instance of recording or a data recording stage having a temporal continuity, and each of data recording stages 1, 2, and 3 are made up of a number of DVUs dependent on the amount of data being recorded.

The verify-after-write operation is performed by the optical disc recording/reproducing device 100, which executes a repetitious series of detecting operations to determine the presence of defective areas corresponding to the written data of one DVU. In each defective area detecting operation, the data written in the DVU is reproduced to verify its recording status; that is, it is determined whether the data was written successfully such that normal reproduction is possible. If normal reproduction cannot be verified, it is determined that a defect is present.

For example, after sequentially and continuously writing data in physical clusters 1-5 of the DVU 1 through a recording operation S10, the optical disc recording/reproducing device 100 performs a verify-after-write operation by progressively reproducing the data written in the DVU 1, to verify normal reproduction and thereby detect the presence of any defective areas. In progressively reproducing, the optical disc recording/reproducing device 100 sequentially reads the data as written, starting again from the first (or next in position) cluster and reading continuously until detection of the first (or next) occurrence of an unverifiable data cluster through a reproducing operation S11, indicating the presence of a defective area in, say, the physical cluster 2. Then, the optical disc recording/reproducing device 100 temporarily stores in its memory 114 the data of the physical cluster 2. The temporarily stored (buffered) data is used to carry out a replacement write operation through a recording operation S12, whereby replacement data corresponding to the defective cluster is written as a replacement cluster 2' in the OSA instead of the defective area. Here, the data of the second cluster may be written starting from either end of the OSA.

After the completion of a replacement write operation as above, the optical disc recording/reproducing device 100 continues reproducing the data of the DVU 1 through a reproducing operation S13, progressing to the next cluster, i.e., to the physical cluster 3. When another defective area is detected in, say, the physical cluster 4, the optical disc recording/reproducing device 100 carries out another replacement write operation through a recording operation S14, in which the data of the defective cluster is buffered and then written as a replacement cluster 4' in the OSA in succession to the replacement cluster 2'.

A continuation of the verify-after-write operation for DVU 1 through a reproducing operation S15 may find no further defective areas, which completes the data recording of DVU 1 for the data recording stage 1. Thus, the DVU 1 ultimately contains the data of the physical clusters 1, 3, and 5 and has two defective areas, the data of which is written in the OSA as replacement clusters 2' and 4' corresponding to the defective areas. The same process is repeated for each DVU until the conclusion of the data recording stage 1 by the execution of recording and verify-after-write operations for the DVU n. In doing so, a physical cluster 6 is written as the first cluster of the DVU 2.

Thereafter, i.e., in succession to a completed verify-after-write operation for the DVU n, the optical disc recording/reproducing device 100 writes a defective area data locator for identifying each defective area and locating the corresponding replacement data. These locators are written as TDFL information and stored in the TDFL area. To increase the access rate of the TDFL information, the optical disc recording/reproducing device 100 also writes, as disc definition structure (DDS) information, write location information in a defect management area (DMA) assigned in the LIA.

Figure 4:
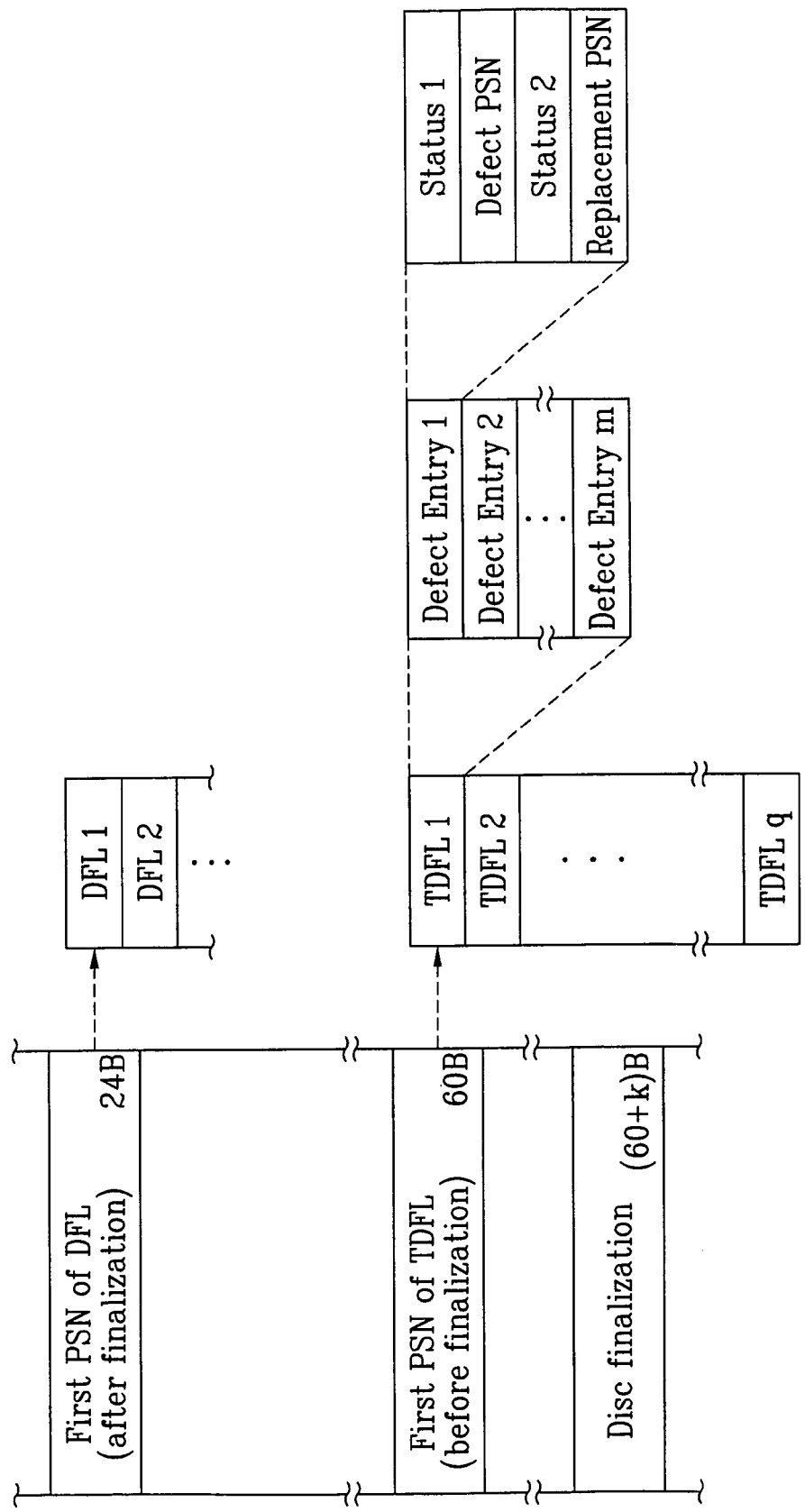
FIG. 4 is a diagram showing locator information written according to the method of the present invention.

As shown in FIG. 4, the TDFL information comprises a plurality of defect entries, each expressed as pair of PSNs, i.e., a defect PSN and a replacement PSN corresponding thereto. Here, the defect PSN is the physical sector number of the defective area, and the replacement PSN is the physical sector number of the area in which the data of the defective area is written. Each defect entry includes status information in addition to the PSNs. The status information is comprised of status 1 and status 2 information, with the status 2 information going unused in the present embodiment. The status 1 information indicates the type of relationship existing between a defective or potentially defective area and any replacement data corresponding thereto, including replacement data recording status, address assignment, defective area confirmation, replacement area availability, and the like.

The recording sector corresponding to, say, the 60th byte (60th byte position) of the DDS information may include write location information for accessing the first PSN for the current TDFL information, i.e., the TDFL information reflecting the latest (most recent) replacement write operation. This write location information is written and managed together with identification information, which comprises a disc finalization flag indicating whether a disc finalization operation has been executed, signaling that the writing process of an optical disc is finalized.

When the identification information shows no disc finalization, the optical disc recording/reproducing device 100 reads the DMA and refers to the write location information to search for a write location. One byte of the identification information may, for example, be written as "0000 XXXX" to indicate that no disc finalization operation has been executed, to be set to "0000 1111" to indicate the execution of disc finalization. At the same time, the identification information may have a size greater than one byte, and the execution of the disc finalization operation may be indicated using values other than "0000 XXXX" and "0000 1111." The DDS information may include write location information for accessing both the first TDFL and the current TDFL, or for selectively accessing either.

When a disc finalization operation is executed according to user operation, the optical disc recording/reproducing device 100 sets the disc finalization flag from a value (e.g., "0000 XXXX") indicating that no disc finalization operation has been executed to a value (e.g., "0000 1111") indicating a disc-finalized state and writes the TDFL information as defect list (DFL) information in the DMA. Thus, upon disc finalization, the write location information stored within the DDS information is written as a final value indicative of the write location of the DFL information. The recording sector corresponding to the 24th byte (24th byte position) of the DDS information may include write location information for accessing the first PSN of the DFL information.

Figure 5:
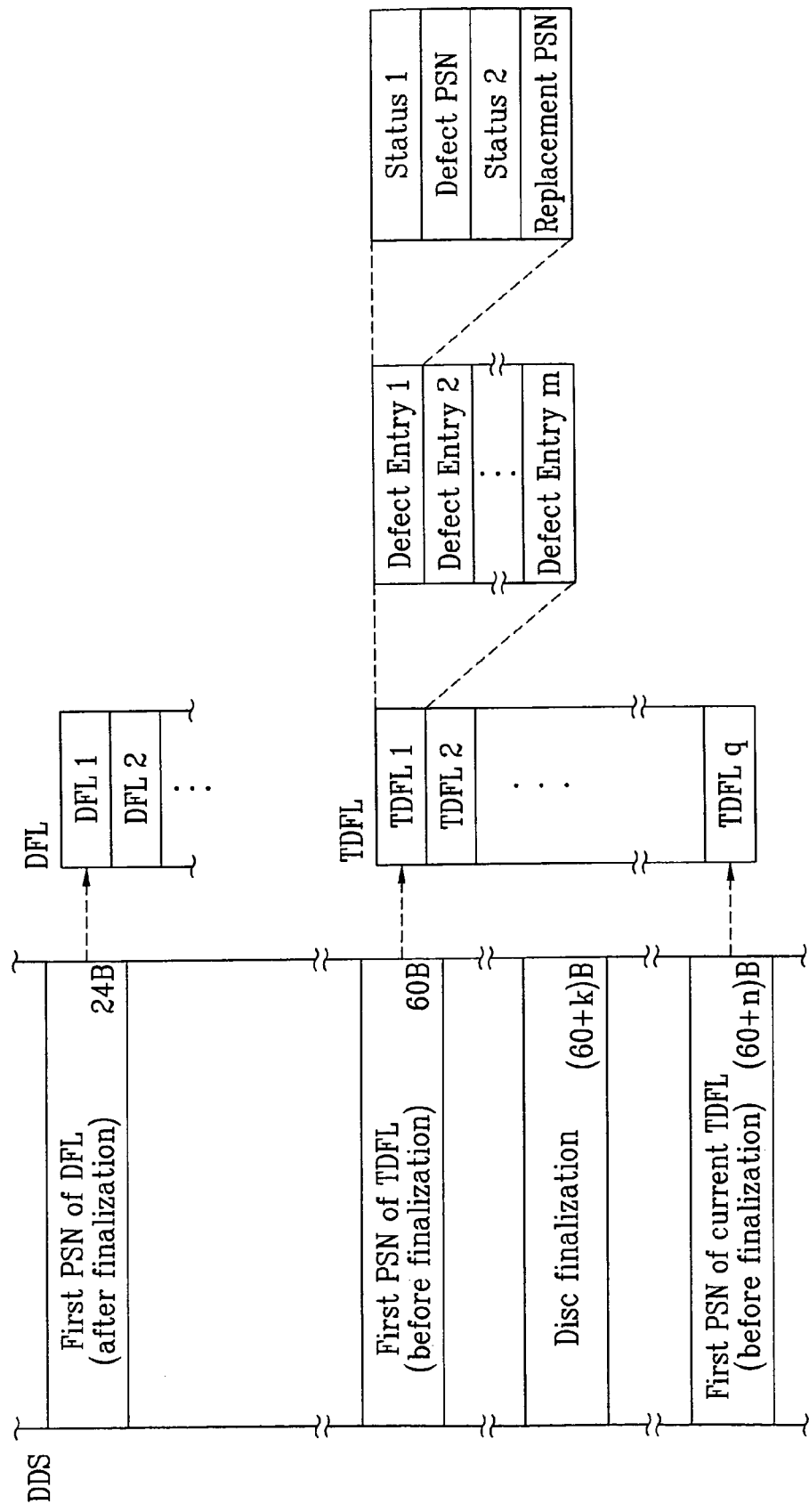
FIG. 5 is a diagram showing locator information written according to the method of the present invention, whereby an access rate can be increased.

Referring to FIG. 5, the DDS information may, to increase the access rate of the last or latest TDFL information (TDFL q), further include write location information corresponding to the first PSN of the most recently written TDFL, i.e., the TDFL information immediately preceding disc finalization.

Figure 6:
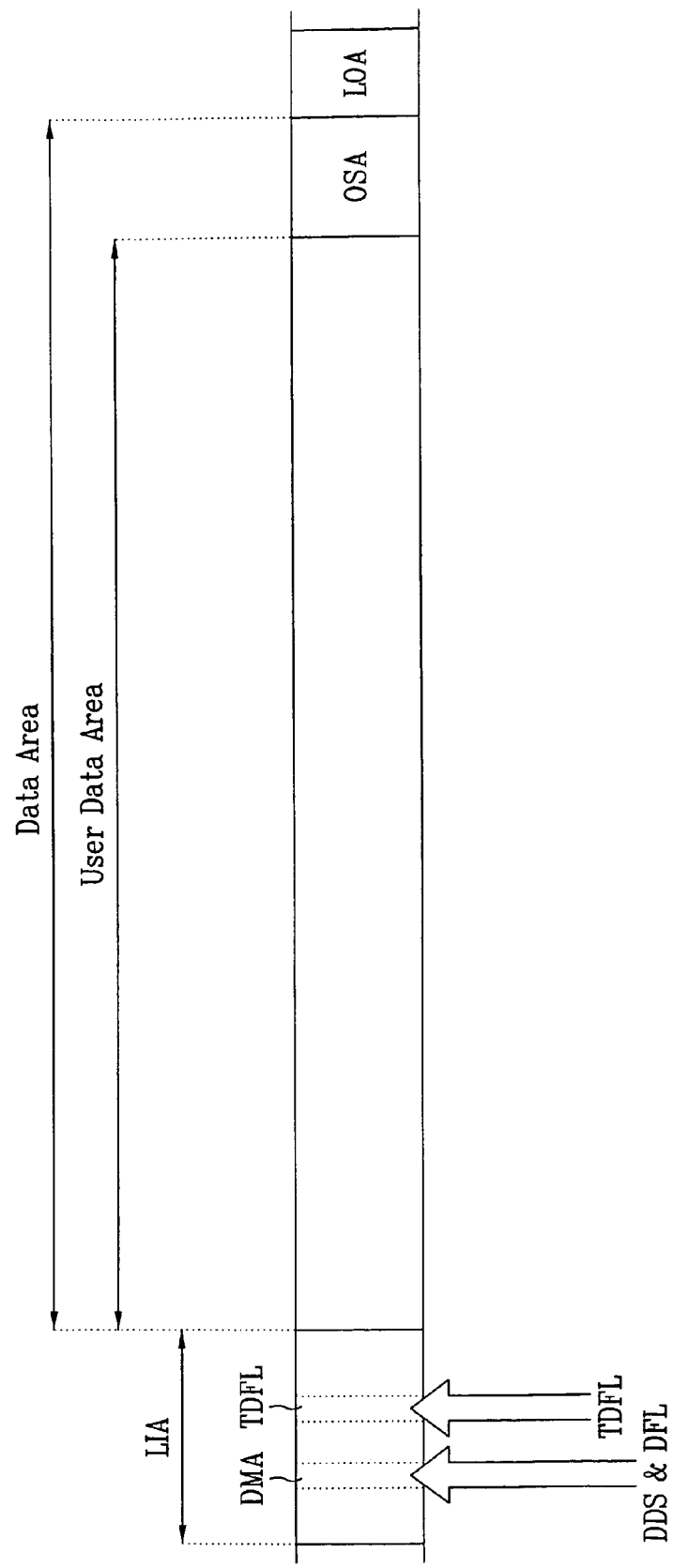
FIG. 6 is a diagram for illustrating a method for managing a defective area on a recording medium, such as a BD-WO type disc, in accordance with another preferred embodiment of the present invention.
Figure 7:
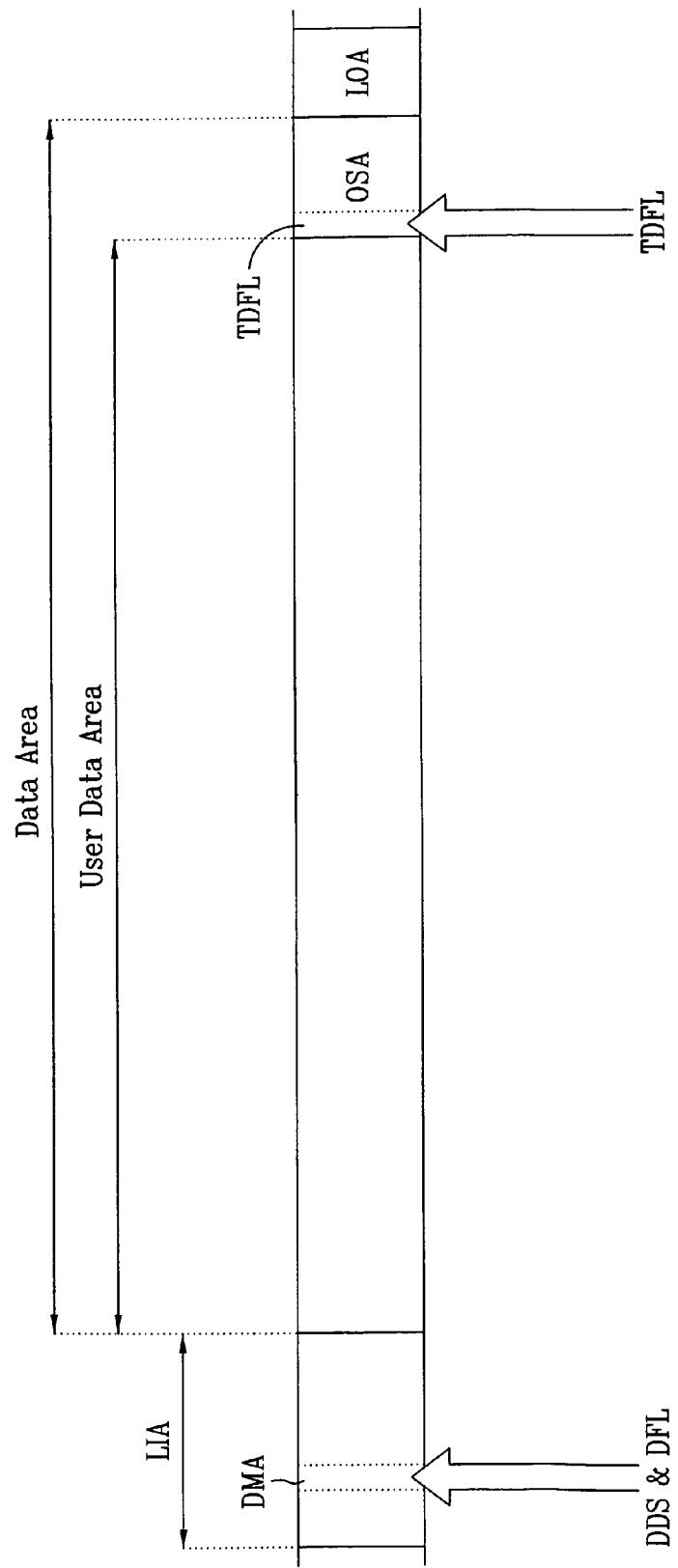
FIG. 7 is a diagram for illustrating a method for managing a defective area on a recording medium, such as a BD-WO type disc, in accordance with another preferred embodiment of the present invention.

As shown in FIG. 6, the TDFL information may be included in a recording sector in the LIA. On the other hand, as shown in FIG. 7, the TDFL information may be assigned to a recording sector within the OSA, or may be assigned elsewhere, such as in the LOA.

In the method of the present invention, when an optical recording medium such as a BD-WO type disc is placed into a programmable system such as that shown in FIG. 1, the optical disc recording/reproducing device 100 searches the DMA assigned to the disc's LIA, detects the disc finalization flag from the DDS information of the DMA, checks its value, and thereby determines whether the disc has been finalized. If the disc finalization flag is a value showing that no disc finalization has occurred, the optical disc recording/reproducing device 100 searches and accesses write location information pertaining to the first and/or last (latest) TDFL information in the DDS information, to then search and access the TDFL information. The optical disc recording/reproducing device 100 then carries out a series of replacement write operations or reproducing operations. If, on the other hand, the disc finalization flag is a value showing that disc finalization has occurred, the optical disc recording/reproducing device 100 searches and accesses write location information pertaining to the first and/or last (latest) DFL information stored within the DDS information, to then search and access the DFL information. The optical disc recording/reproducing device 100 may then carry reproducing operations.

By adopting the method for managing a defective area on a write-once optical recording medium according to the present invention, data to be written on a defective area of the disc is written, and effectively managed, through the performance of a replacement write operation in which the data is written in an alternative (spare) data area corresponding to the defective area. Thus, an optical recording medium such as the recently developed BD-WO type disc formatted according to the method can be used to record data through a write-once operation, so that recorded data can be reproduced normally even when there are defects present on the disc. Moreover, adoption of the method of the present invention will facilitate BD-WO standardization by providing a suitable write-once optical recording medium whereby data to be written on a defective area thereof can be effectively managed.

It will become apparent to those skilled in the art that various modifications and variations can be made in the method for managing a defective area on a write-once optical recording medium, and an optical recording medium using the same, according to the present invention without departing from the spirit or scope of the invention. Thus, it is intended that the present invention cover such modifications and variations provided they come within the scope of the appended claims and their equivalents.

What is claimed is:

1. A method for managing a defective area of a recording medium, comprising:
    identifying a finalization state by searching identification information indicating whether or not the recording medium is finalized;
    searching a location of defect list information recorded in a management area when the identification information indicating the recording medium is finalized; and
    searching a location of latest temporary defect list information recorded in a temporary management area when the identification information indicating the recording medium is not finalized.

2. The method of claim 1, the method further comprising:
    performing either a writing operation or reproducing operation according to the latest temporary defect list information when the identification information indicating the recording medium is not finalized.

3. The method of claim 1, the method further comprising:
    performing a reproducing operation according to the defect list information when the identification information indicating the recording medium is finalized.

4. The method of claim 1, wherein the location of defect list information recorded in the management area includes a first physical sector number of the defect list information.

5. The method of claim 1, wherein the location of latest temporary defect list information recorded in the temporary management area includes a first physical sector number of the latest temporary defect list information.

6. The method of claim 1, wherein the identification information indicating whether or not the recording medium is finalized comprises at least one byte.

7. An apparatus for managing a defective area of a recording medium, comprising:
   an optical pickup configured to read/write data from/on the recording medium; and
   a controller, operatively coupled to the optical pickup, configured to identify a finalization state by searching identification information indicating whether or not the recording medium is finalized, to search a location of defect list information recorded in a management area when the identification information indicating the recording medium is finalized, and to search a location of latest temporary defect list information recorded in a temporary management area when the identification information indicating the recording medium is not finalized.

8. The apparatus of claim 7, wherein the controller is further configured to control the optical pickup to perform either a writing operation or reproducing operation according to the latest temporary defect list information when the identification information indicating the recording medium is not finalized.

9. The apparatus of claim 7, wherein the controller is further configured to control the optical pickup to perform reproducing operation according to the defect list information when the identification information indicating the recording medium is finalized.

10. The apparatus of claim 7, wherein the location of defect list information recorded in the management area includes a first physical sector number of the defect list information.

11. The apparatus of claim 7, wherein the location of latest temporary defect list information recorded in the temporary management area includes a first physical sector number of the latest temporary defect list information.

12. The apparatus of claim 7, wherein the identification information indicating whether or not the recording medium is finalized comprises at least one byte.

13. A recording medium having a lead-in area and a data area, the recording medium comprising:
    an area used to indicate a finalization state by using identification information indicating whether or not the recording medium is finalized;
    a final management area used to store defect list information when the identification information indicating the recording medium is finalized; and
    a temporary management area used to store temporary defect list information when the identification information indicating the recording medium is not finalized.

14. The recording medium of claim 13, wherein the final management area is allocated within the lead-in area.

15. The recording medium of claim 13, wherein the temporary management area is allocated within the lead-in area.

16. The recording medium of claim 13, wherein the temporary management area is allocated within a spare area of the data area.

* * * * *